United States Patent
Fu et al.

(10) Patent No.: US 7,569,452 B2
(45) Date of Patent: Aug. 4, 2009

(54) SCREEN-PRINTED FILTER CAPACITORS FOR FILTERED FEEDTHROUGHS

(75) Inventors: Richard Fu, Ellicott City, MD (US); Christine Frysz, Orchard Park, NY (US); Mingguang Zhu, East Amherst, NY (US); Kenneth Billings, Lancaster, NY (US)

(73) Assignee: Greatbatch Ltd., Clarence, NY (US)

( * ) Notice: Subject to any disclaimer, the term of this patent is extended or adjusted under 35 U.S.C. 154(b) by 243 days.

(21) Appl. No.: 11/470,018

(22) Filed: Sep. 5, 2006

(65) Prior Publication Data

US 2007/0053137 A1    Mar. 8, 2007

Related U.S. Application Data

(60) Provisional application No. 60/728,646, filed on Sep. 2, 2005.

(51) Int. Cl.
*H01L 21/8242* (2006.01)

(52) U.S. Cl. .......... 438/253; 257/E21.01; 257/E21.017; 361/320

(58) Field of Classification Search ................. 438/253; 257/E21.01, E21.016, E21.017; 361/320, 361/302, 306.2
See application file for complete search history.

(56) References Cited

U.S. PATENT DOCUMENTS

| | | | |
|---|---|---|---|
| 3,137,808 A | 6/1964 | Coda et al. | |
| 4,424,551 A | 1/1984 | Stevenson et al. | |
| 4,999,595 A * | 3/1991 | Azumi et al. | 333/184 |
| 5,333,095 A | 7/1994 | Stevenson et al. | |
| 5,700,548 A | 12/1997 | Warnier et al. | |
| 5,751,539 A | 5/1998 | Stevenson et al. | |
| 6,456,481 B1 | 9/2002 | Stevenson | |
| 2002/0151220 A1 * | 10/2002 | Dingenotto et al. | 439/620 |
| 2002/0166618 A1 * | 11/2002 | Wolf et al. | 156/89.12 |
| 2003/0213605 A1 | 11/2003 | Brendel et al. | |
| 2005/0195556 A1 | 9/2005 | Shah | |

* cited by examiner

*Primary Examiner*—Caridad M Everhart
(74) *Attorney, Agent, or Firm*—Michael F. Scalise

(57) ABSTRACT

A filter capacitor comprising a pre-sintered substrate supporting alternating active and ground electrode layers segregated by a dielectric layer is described. The substrate is of a ceramic material that maintains its shape and structure dimensions even after undergoing numerous sintering steps. Consequently, relatively thin active and ground electrode layers along with the intermediate dielectric layer can be laid down or deposited by a screen-printing technique. Using a relatively thin over-glaze in comparison to a thick upper dielectric layer finishes the capacitor. Consequently, a significant amount of space is saved in comparison to a comparably rated capacitor or, a capacitor of a higher rating can be provided in the same size as a conventional prior art capacitor. The pre-sintered ceramic substrate is used instead of conventional tape cast technology for the base dielectric.

24 Claims, 9 Drawing Sheets

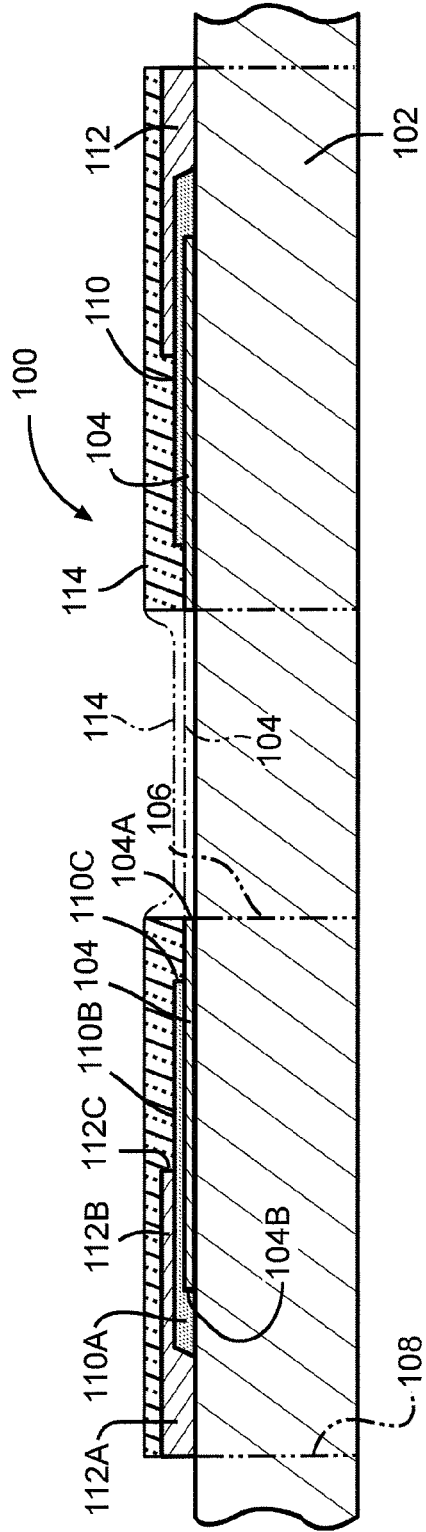
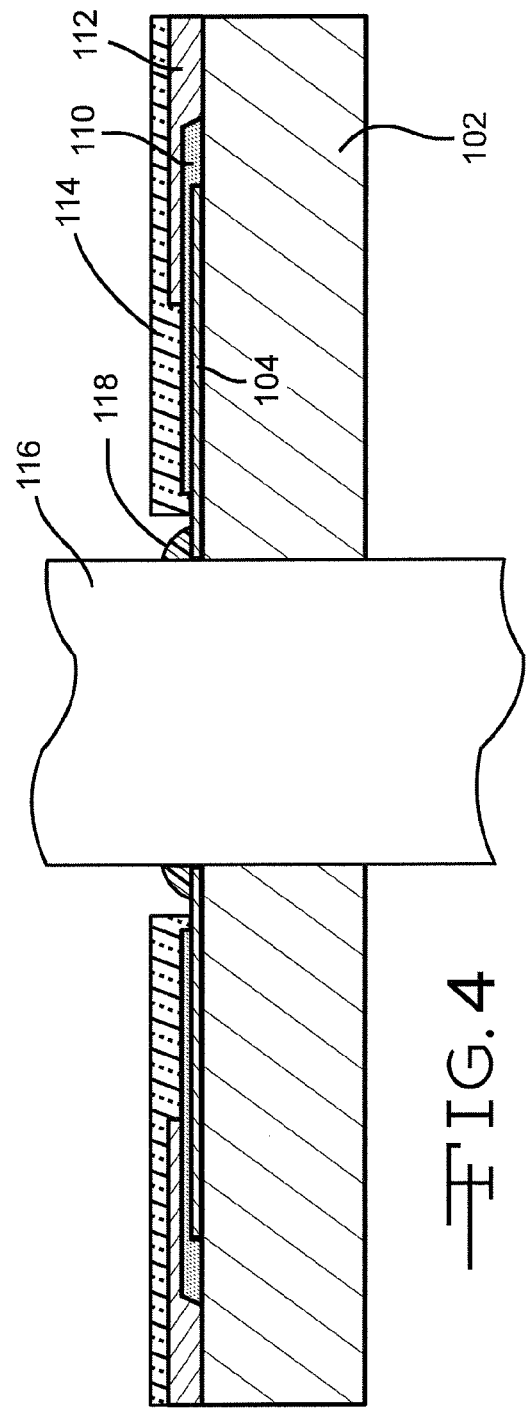

SCREEN-PRINTED FILTER CAPACITORS FOR FILTERED FEEDTHROUGHS

CROSS-REFERENCE TO RELATED APPLICATION

This application claims priority from provisional application Ser. No. 60/728,646, filed Sep. 2, 2005.

BACKGROUND OF THE INVENTION

1. Field of the Invention

This invention relates generally to simplified feedthrough filter capacitor assemblies and related methods of construction. Feedthrough filter capacitor assemblies are used to decouple and shield undesirable electromagnetic interference (EMI) signals from implantable medical devices and other electronic devices.

More specifically, this invention relates to simplified and reduced cost filter capacitors for ceramic feedthrough terminal pin assemblies. In the present invention, the filter capacitor assembly is mounted to the ceramic feedthrough terminal pin assembly. The ceramic feedthrough is used to connect a terminal pin or electrode through a hermetically sealed housing to internal electronic components of the medical device while the filter capacitor decouples EMI signals against entry into the sealed housing via the terminal pin. This invention is particularly designed for use in cardiac pacemakers (bradycardia devices), cardioverter defibrillators (tachycardia), neurostimulators, internal drug pumps, cochlear implants and other medical implant applications. This invention is also applicable to a wide range of other EMI filter applications, such as military or space electronic modules, where it is desirable to preclude entry of EMI signals into a hermetically sealed housing containing sensitive electronic circuitry.

In that respect, feedthrough terminal pin assemblies are generally well known in the art for connecting electrical signals through the housing or case of an electronic instrument. For example, in implantable medical devices such as cardiac pacemakers, defibrillators, and the like, the feedthrough assembly comprises one or more conductive terminal pins supported by an insulator structure for feedthrough passage from the exterior to the interior of the medical device. Many different insulator structures and related mounting methods are known in the art for use in medical devices wherein the insulator structure provides a hermetic seal to prevent entry of body fluids into the housing thereof. However, the feedthrough terminal pins are typically connected to one or more lead wires leading to a body organ such as a heart. The lead wires effectively act as an antenna and tend to collect stray EMI signals for transmission into the interior of the medical device. That is why hermetic feedthrough assemblies are combined with a ceramic feedthrough filter capacitor to decouple interference signals to the medical device housing. However, a primary feature of the simplified feedthrough filter capacitor described herein is volume reduction without compromising effectiveness and reliability. This is accomplished by elimination of some of the volume previously occupied by the capacitor dielectric using new screen printing techniques. The present feedthrough filter capacitor is also less costly to manufacture than a comparably rated prior art capacitor.

2. Prior Art

In a typical prior art unipolar construction for a feedthrough filter capacitor, such as described in U.S. Pat. No. 5,333,095 to Stevenson et al., a round/discoidal (or rectangular) ceramic feedthrough filter capacitor is combined with a hermetic feedthrough terminal pin assembly. In use, the coaxial capacitor permits passage of relatively low frequency electrical signals along the terminal pin while shielding and decoupling/attenuating undesired interference signals of relatively high frequency to the conductive housing of the medical device.

One type of hermetic feedthrough terminal pin subassembly widely used in implantable medical devices employs an alumina ceramic insulator which, after sputtering/metallization procedures, is gold brazed into a titanium ferrule. In addition, there are terminal pins, typically made of platinum, which are also gold brazed to the alumina ceramic insulator to complete the hermetic seal. See for example, the subassemblies disclosed in U.S. Pat. Nos. 3,920,888; 4,152,540; 4,421,947 and 4,424,551. Separately, the feedthrough filter capacitor is constructed by preassembly of the coaxial capacitor and then mounting it onto or within the cylindrical or rectangular hermetically sealed feedthrough terminal pin subassembly including the conductive pins and ferrule.

The feedthrough capacitor is of a coaxial construction having two sets of electrode plates embedded in spaced relation within an insulative dielectric substrate or base. The dielectric base is typically formed as a ceramic monolithic structure. One set of "active" electrode plates is electrically connected at an inner diameter cylindrical surface to a terminal pin in a unipolar (one terminal pin) construction. Feedthrough capacitors are also available in bipolar (two), tripolar (three), quadpolar (four), pentapolar (five), hexpolar (six), and additional terminal pin configurations. The inner active plates are coupled in parallel together by a metallized layer which is either glass frit fired or plated onto the ceramic capacitor. This metallized band, in turn, is mechanically and electrically coupled to the terminal pin by a conductive adhesive or soldering, and the like.

The other or second set of "ground" electrode plates is coupled at an outer diameter surface of the discoidal capacitor to a cylindrical ferrule of conductive material. The outer ground plates are coupled in parallel together by a metallized layer which is fired, sputtered or plated onto the ceramic capacitor. This metallized band, in turn, is coupled to the ferrule by conductive adhesive, soldering, brazing, welding, and the like. The ferrule is electrically connected in turn to the conductive housing of the electronic device.

The device housing is constructed from a biocompatible metal such as of a titanium alloy, which is electrically and mechanically coupled to the hermetic feedthrough terminal pin subassembly, which is, in turn, electrically coupled to the feedthrough filter capacitor. As a result, the filter capacitor coupled to the feedthrough terminal pin subassembly prevents entrance of interference signals to the interior of the device housing, where such interference signals could otherwise adversely affect the desired device function such as cardiac pacing or defibrillation.

Although feedthrough filter capacitor assemblies of the type described perform in a generally satisfactory manner, the associated manufacturing and assembly costs are unacceptably high. One area where costs can be reduced is in the manufacture of the feedthrough filter capacitor.

FIG. 1 illustrates a typical prior art filter feedthrough capacitor assembly 10 comprising a filter capacitor 12 mounted to a feedthrough terminal pin subassembly 14. The filter feedthrough capacitor assembly 10 is shown in one preferred form comprising a so-called bipolar configuration having two separate conductive terminal pins 16 extending through the discoidal-shaped filter capacitor 12 and feedthrough terminal pin subassembly 14.

The feedthrough terminal pin subassembly 14 comprises a ferrule 18 defining an insulator-receiving bore 20 surrounding an insulator 22. Suitable electrically conductive materials for the ferrule substrate 18 include titanium, tantalum, niobium, stainless steel or combinations of alloys thereof. Titanium is preferred for the ferrule 18, which may be of any geometry, non-limiting examples being round, rectangle, and oblong. A surrounding inwardly facing annular channel 24 is provided in the ferrule 18 to facilitate attachment of the filter feedthrough capacitor assembly 10 to the casing 26 of, for example, the implantable medical device. The method of attachment may be by laser welding or other suitable methods.

The insulator 22 is of a ceramic material such as of alumina, zirconia, zirconia toughened alumina, aluminum nitride, boron nitride, silicon carbide, glass or combinations thereof. Preferably, the insulating material 22 is alumina, which is highly purified aluminum oxide, and comprises a sidewall 22A extending to a first upper surface 22B and a second lower surface 22C. A layer of metal 28, referred to as metallization, is applied to the sidewall 22A of the insulating material 22 to aid in the creation of a brazed hermetic seal. Suitable metallization materials 28 include titanium, niobium, tantalum, gold, palladium, molybdenum, silver, platinum, copper, carbon, carbon nitride, titanium nitrides, titanium carbide, iridium, iridium oxide, tantalum, tantalum oxide, ruthenium, ruthenium oxide, zirconium, and mixtures thereof. The metallization layer 28 may be applied by various means including, but not limited to, sputtering, e-beam deposition, pulsed laser deposition, plating, electroless plating, chemical vapor deposition, vacuum evaporation, thick film application methods, aerosol spray deposition, and thin cladding.

The insulator 22 has a sufficient number of bores 30 to receive the terminal pins 16. The inner surfaces of these bores 30 are provided with a metallization layer 32 in a similar manner as the previously described insulator sidewall 22A. The terminal pins 16 are then received in the bores 30. Preforms (not shown) of a conductive, biostable material, such as gold or gold alloy, are moved over the terminal pins 16 to rest against the upper insulator surface 22B adjacent to annular notches 34 in the insulator. Similarly, a gold preform (not shown) is positioned at the junction of the ferrule insulator-receiving bore 20 and the upper insulator surface 22B. The thusly-assembled feedthrough terminal pin assembly 14 is then heated in an oven or furnace to melt the preforms and cause them to form their respective brazes 36 and 38. Braze 36 hermetically seals the terminal pins 16 to the insulator 22 at the terminal pin bores 30 while braze 38 hermetically seals the insulator 22 to the ferrule 18 at the insulator-receiving bore 20.

The feedthrough filter capacitor 12 comprises a dielectric 40 formed from multiple layers of a tape cast ceramic or ceramic-based material containing multiple capacitor-forming conductive first "active" electrode layers 42 and second "ground" electrode layers 44 screen-printed in an alternating manner on top of the tape cast dielectric. This layered assembly is then sintered to provide a monolithic dielectric body containing the electrode layers 42, 44. Although the exemplary drawing shows in exaggerated scale a pair of the active electrode layers 42 in parallel staggered relation with a corresponding pair of the ground electrode layers 44, it will be understood that a large plurality of typically 5 to 40 conductive layers 42 can be provided in alternating stacked and parallel spaced relation with a corresponding number of the conductive layers 44.

Each of the active electrode layers 42 is subdivided into two spaced-apart and generally pie-shaped electrode plates (not shown). Accordingly, the two electrode plates 42 of each layer group are electrically insulated from each other by the dielectric material 40 of the capacitor 12. The multiple spaced-apart layers of the active electrode plates 42 are formed in stacked alignment with the respective active electrode plates 42 of overlying and underlying layers to define two respective active plate stacks. The two terminal pins 16 pass generally centrally through respective bores 46 formed in these active plate stacks, and are conductively coupled to the associated stacked set of active electrode plates 42 by a suitable conductive surface lining such as a surface metallization layer 48 lining each bore 46.

A plurality of spaced-apart layers of the second or "ground" electrode plates 44 are also formed within the capacitor 12. The ground electrode plates 44 are in stacked relation alternating or interleaved with the layers of active electrode plates 42. These ground electrode plates 44 include outer perimeter edges which are exposed at the outer periphery of the dielectric body 18 where they are electrically connected in parallel by a suitable conductive surface such as a surface metallization layer 50. Importantly, however, the outer edges of the active electrode plates 42 terminate in spaced relation with the outer periphery of the capacitor body 12. In that manner, the active electrode plates 42 are electrically isolated by the dielectric body 40 from the conductive layer 50 coupled to the ground electrode plates 44. Similarly, the ground electrode plates 44 have inner edges which terminate in spaced relation with the terminal pin bores 46, whereby the ground electrode plates 44 are electrically isolated by the dielectric body 40 from the terminal pins 16 and the conductive metallization layer 48 lining the pin bores 46. The number of active and ground electrode plates 42 and 44, together with the dielectric 18 thicknesses or spacing therebetween may vary in accordance with the desired capacitance value and voltage rating.

The feedthrough capacitor assembly 10 is constructed by moving the filter capacitor 12 over the feedthrough terminal pin subassembly 14. A non-conductive disk-shaped member 52 is positioned about the terminal pins 16 at a location sandwiched between the upper insulator surface 22B of the feedthrough terminal pin subassembly 14 and the bottom of the capacitor terminal pin bores 46. In this position, the non-conductive disc 52 supports the capacitor 12 in spaced relation above the insulating material 22. The metallized surface 48 within the terminal pin bores 46 is then connected electrically to the terminal pins 16 by means of a conductive adhesive bead 54, or by soldering or brazing or the like. In a preferred form, the conductive adhesive 54 is applied to the annular gap between the pins 16 and the capacitor metallized surface 48, and allowed to fill a portion (about one-half) of the gap length. Similarly, the metallized surface 50 associated with the ground electrode plates 44 of the capacitor 12 is connected electrically to the ferrule 18 by means of an additional fillet 56 of conductive adhesive or the like. One preferred conductive adhesive comprises a curable polyimide adhesive loaded with conductive particles such as spheres or flakes, as described by way of example in U.S. Pat. No. 4,424,551, which is incorporated by reference herein. However, it will be understood that other conductive connecting means may be used, such as solder, braze or the like. Importantly, the adhesive beads 54, 56 establish an electrically conductive mounting of the capacitor 12 in a secured stable manner to the feedthrough terminal pin assembly 14.

Mechanically, the barium titanate material typically used as the capacitor dielectric material 40 is relatively weak and prone to fracture. Also, if the dielectric material 40 is not sufficiently thick, it tends to warp into a "potato chip" shape upon being heated during sintering of the tape cast material. That is why in the prior art filter feedthrough capacitor assembly 10, the thickness of the respective lower and upper dielectric zones 58 and 60 below and above the intermediate zone occupied by the electrode layers 42, 44 is from about 0.007 inches to 0.015 inches, preferably about 0.010 inches. In other words, the thickness from the lower surface of the dielectric 18 adjacent to the non-conductive disc 52 to the lowest ground plate 44 is about 0.010 inches and the distance from the upper active plate 42 to the upper surface of the dielectric body 18 also about 0.010 inches. Depending on the number of active and ground electrode plates and the spacing between them, the intermediate zone in the dielectric body supporting the electrode plates 42, 44 is typically a minimum of about 0.010 inches, to much more. Therefore, the capacitor 12 is generally of a minimum thickness of about 0.030 inches and in certain applications can be significantly greater. The bulk of this thickness is occupied by the lower and upper dielectric zones 58, 60 sandwiching the intermediate zone of the electrode plates and each being about 0.010 inches thick. If these dielectric zones 58, 60 could be made thinner without compromising function and reliability including planarity, significant size reductions could be realized.

Accordingly, there is a need for a novel feedthrough filter capacitor assembly that addresses the drawbacks noted above in connection with the prior art. In particular, a novel capacitor assembly is needed which significantly reduces the volume occupied by this assembly, or is of a comparable volume, but of a significantly higher capacitance rating, without any diminution in filtering performance or reliability and yet that may be utilized in many of the same applications where such subassemblies are now found. Additionally, the improved feedthrough filter capacitor assembly should lend itself to standard manufacturing processes such that cost reductions can be realized immediately. Of course, the new design must be capable of effectively filtering out undesirable electromagnetic interference (EMI) signals from the target device. The present invention fulfills these needs and provides other related advantages.

SUMMARY OF THE INVENTION

In a preferred form, a feedthrough terminal pin filter assembly according to the present invention comprises an outer ferrule hermetically sealed to an alumina insulator or a fused glass dielectric material seated within the ferrule. The insulator or dielectric material is also hermetically sealed to at least one terminal pin. That way, the feedthrough assembly prevents leakage of fluid, such as body fluid in a human implant application, past the hermetic seal at the insulator/ferrule and insulator/terminal pin interfaces.

When used in an implanted medical device, the feedthrough terminal pins are connected to one or more lead wires which sense signals from the patient's heart and also couple electronic pacing pulses from the medical device to the heart. Unfortunately, these lead wires can act as an antenna to collect stray EMI signals for transmission via the terminal pins into the interior of the medical device. Such unwanted EMI signals can disrupt proper operation of the medical device, resulting in malfunction or failure. To prevent unwanted EMI signals from transmitting via the terminal pins into the interior of the medical device, a filter capacitor is mounted on the ferrule.

According to the present invention, the filter capacitor comprises at least one active electrode layer (plate) and at least one ground electrode layer (plate) physically segregated from each other by a dielectric. The dielectric and the electrode layers are screen printed on an alumina substrate. The use of an alumina substrate in conjunction with screen printing of the various layers comprising the capacitor means that the total thickness of the capacitor is significantly less than that of a conventionally constructed filter capacitor. Since these capacitor devices are intended for use in applications where a premium is placed on space, such as in implantable medical devices, and the like, providing a filter capacitor of reduced size represents a significant advancement in the art. This is done without compromising the capacitor's effectiveness in attenuating unwanted EMI signals or its voltage rating.

These and other objects and advantages of the present invention will become increasingly more apparent by a reading of the following description in conjunction with the appended drawings.

BRIEF DESCRIPTION OF THE DRAWINGS

FIG. 3 is a cross-sectional view taken along line 3-3 of FIG. 2.

FIG. 4 is a partial cross-sectional view of the filter capacitor shown in FIG. 3 electrically connected to a terminal pin 116 by a conductive epoxy bead 118.

DETAILED DESCRIPTION OF THE PREFERRED EMBODIMENTS

Figure 2:
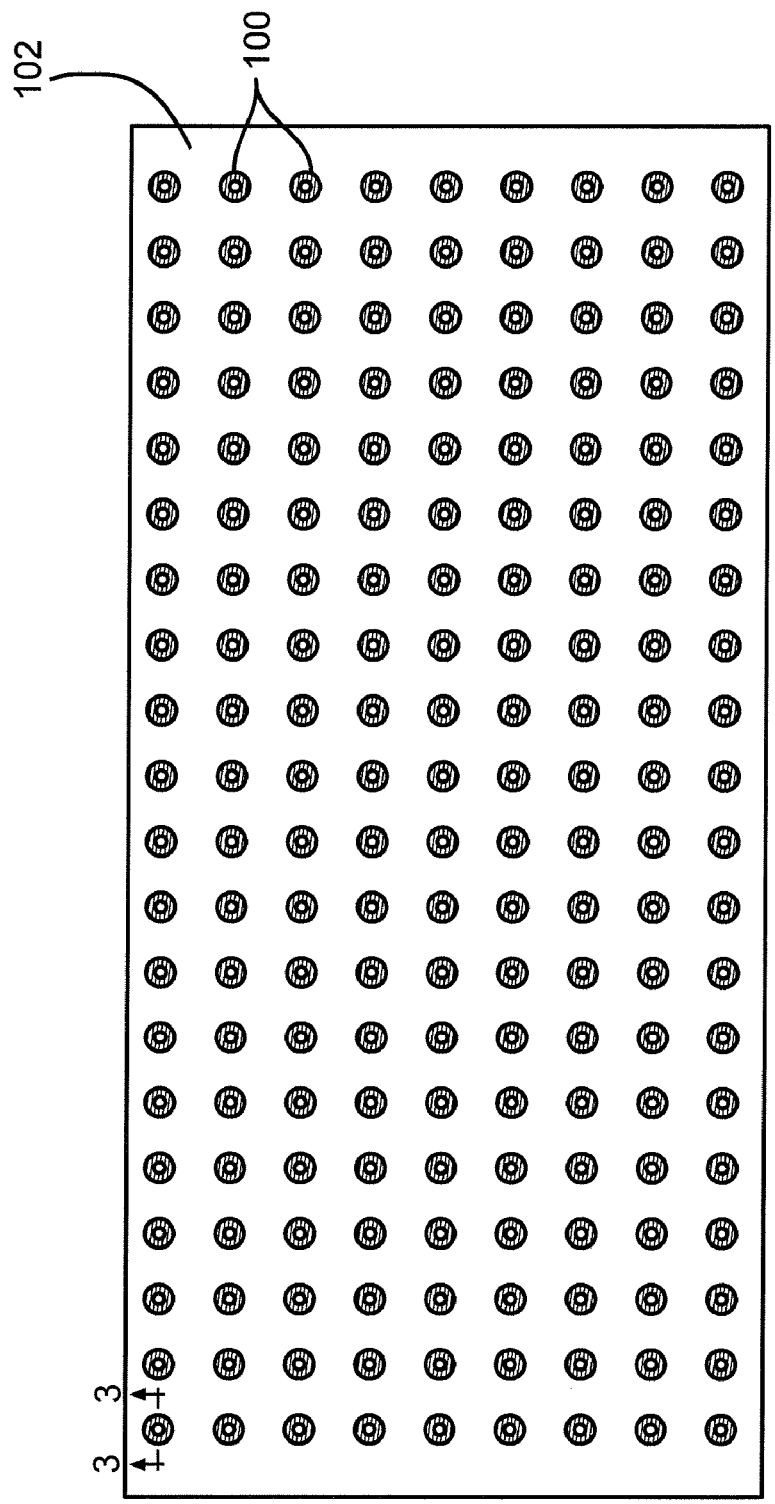
FIG. 2 is a plan view of a plurality of capacitors 100 supported on a substrate 102 by a screen-printing process according to the present invention.

Referring now to the drawings, a preferred screen-printing manufacturing process for constructing a filter capacitor 100 according to the present invention is shown in FIGS. 2 to 4 and 6. The screen-printing process includes a screen-printing machine (not shown) that accurately and precisely prints the various layers comprising the capacitor 100 on a substrate 102. The substrate 102 is a planar member of an insulator material that is dimensionally stable at typical sintering temperatures of about 700° C. to about 1,300° C. in both the "x" and "y" directions (width and length). The substrate 102 is preferably a ceramic material selected from the group consisting of alumina, zirconia, zirconia toughened alumina, aluminum nitride, boron nitride, silicon carbide, glass or combinations thereof. More preferably, the substrate insulating material 102 is pre-sintered alumina, which is highly purified aluminum oxide, for example 96% pure sintered alumina having a thickness of about 0.003 inches to about 0.040 inches, preferably about 0.010 inches. FIG. 2 illustrates one completed capacitor substrate comprising 180 individual capacitor structures printed on the alumina substrate 102 in nine rows of twenty capacitors 100.

FIG. 3 shows that a representative one of the capacitors 100 is built by first screen-printing a bottom conductive layer 104 directly on the substrate 102. Layer 104 is screen-printed to cover the area that will eventually become the terminal pin bore 106. This is done for ease of manufacturing. In its final form, layer 104 comprises an inner, proximal edge 104A extending from the bore 106 to a distal edge 104B, spaced from an outer edge 108 of the capacitor. The terminal pin bore 106 is shown in phantom because it is preferably cut out of the substrate 102 later in the manufacturing process although, if desired, the bore 106 can be provided before any screen printing takes place. Similarly, the outer edge 108 of the capacitor 100 is shown in phantom because it is preferably cut into the substrate 102 at completion of the screen printing process, but that is not necessary. A preferred cutting method is by laser cutting. While shown in cross-section, it should be understood that the bottom active electrode layer extends 360° about the circumference of the terminal pin bore 106. Suitable active materials include Au, Pt, Cu, Ni, Ir, Pd, Ta-based pastes, the preferred one being an Ag—Pt based paste.

Preferably, the bottom active electrode layer 104 consists of two sub-layers, although one or more than two can be used if desired. After each active sub-layer is printed, the alumina substrate 102 is put into a belt fed infrared oven to dry-out or flash-off any remaining solvent in the printed pattern. After the requisite number of sub-layers are printed and dried, the thusly processed alumina substrate 102 is put in a furnace to sinter the active electrode layer 104. The sintering furnace is a batch oven with a controlled heating rate. The substrate is heated to a maximum sintering temperature of about 850° C. where it is held for about 10 minutes for the preferred Ag—Pt material. The printed material is then cooled to ambient at a controlled rate.

Next, a dielectric layer 110 is screen-printed over the bottom active electrode layer 104. The dielectric layer 110 has a proximal base portion 110A supported directly on the alumina substrate 102 immediately adjacent to the outer edge 104B of the bottom active layer 104. This base portion 110A does not extend completely to the outer edge 108 of the capacitor 100. Instead, the proximal dielectric base portion 110A leads to a distal planar portion 110B that is in direct contact with the upper surface of the bottom active layer 104. The distal dielectric portion 110B extends to an edge 110C that ends spaced from the terminal pin bore 106. The dielectric material is preferably a $BaTiO_3$-based thick film paste with a dielectric constant of about 10,000 k. Other useful dielectric materials are barium strontium titanate and sodium bismuth titanate.

Preferably, the dielectric layer 110 consists of two sub-layers, although one or more than two can be used if desired. After each dielectric sub-layer is printed, the alumina substrate 102 is put into the belt fed infrared oven to flash-off any remaining solvent in the printed pattern. After the requisite number of dielectric sub-layers are printed and dried, the thusly processed alumina substrate 102 is put into the sintering furnace previously used to sinter the active layer 104. The dielectric sinter is performed in a similar manner as that of the active electrode layer 104, except that the maximum heating temperature is held at about 800° C. to about 920° C., preferably about 900° C. for about 10 minutes for the preferred barium titanate.

A ground electrode layer 112 is then screen printed on the substrate 102. The ground electrode layer 112 is of a similar material as the active electrode layer 104 and comprises a base portion 112A supported directly on the substrate 102 immediately adjacent to the outer edge 108 of the capacitor 100. The proximal ground base portion 112A leads to a distal planar portion 112B that is in direct contact with the upper surface of the dielectric layer 110. The distal ground electrode portion 112B extends to an edge 112C spaced from the terminal pin bore 106, but directly vertically above the active electrode layer 104. The ground electrode 112 is of a similar material as the active electrode layer 104 and is dried after each sub-layer and then finally sintered in a similar manner as the active electrode layer 104. Also, the active and ground electrode layers have a thickness of about 0.00075 inches. In a similar manner as the active electrode layer 104, the dielectric layer 110 and the ground electrode layer 112 each extends 360° about the circumference of the terminal pin bore 106.

It is known that the previously described tape cast dielectric materials 40 used to construct the prior art capacitor 10 experience shrinkage factors of from about 8% to about 17% after sintering. This means that the layout and design must take into consideration significant shrinkage rates in designing the final shape and structure of the prior art capacitor 10. On the other hand, the present sintered alumina substrate experiences virtually no additional shrinkage during subsequent sintering of the various screen-printed layers. This is of considerable benefit in designing and modeling the present capacitor 100. Less substrate shrinkage in turn favorably impacts lot-to-lot variability, which is considerably more consistent than using tape cast materials.

The screen-printed capacitor 100 may be finished by screen-printing an over-glaze layer 114 extending to the outer substrate edge 108, but in the capacitor's finished form covering from the outer capacitor edge 108 to the terminal pin bore 106. The over-glaze material is a glass frit paste. The over-glaze layer 114 is subjected to a final sintering in a similar manner as previously described with respect to the dielectric layer 112, except the maximum heating temperature is held at about 300° C. to about 700° C., preferably about 600° C. for about 30 minutes. The over-glaze layer 114 preferably consists of two sub-layers laid down one on top of the other in a similar manner as with the active and ground electrode layers 104, 112 and the dielectric layer 110. Each over-glaze sub-layer is preferably sintered after its deposition.

While the present capacitor 100 has been described using a sintering step after each layer or sub-layer is screen-printed, that is not necessary. For some applications it may be sufficient to provide a capacitor with a dielectric constant of no greater than about 8,000 k. This can be accomplished by screen-printing all the necessary layers and then doing one final sintering. In other words, there is no separated sintering step for each functional layer. After the bottom electrode layer is printed and dried, but not sintered, the dielectric layer is printed on top of the as-printed and dried bottom electrode pattern. After the dielectric layer is printed and dried, but not sintered, the top electrode layer is printed on the dried dielectric pattern. A similar print-dry procedure can be followed to print additional function layers until the desired capacitor sets are achieved. On the other hand, if a capacitor with a dielectric constant up to about 13,000 k is required, the respective layers are individually sintered after being screen-printed. While the former technique results in less capacitance values, it is also significantly less expensive because numerous sintering steps are not required.

Figure 1:
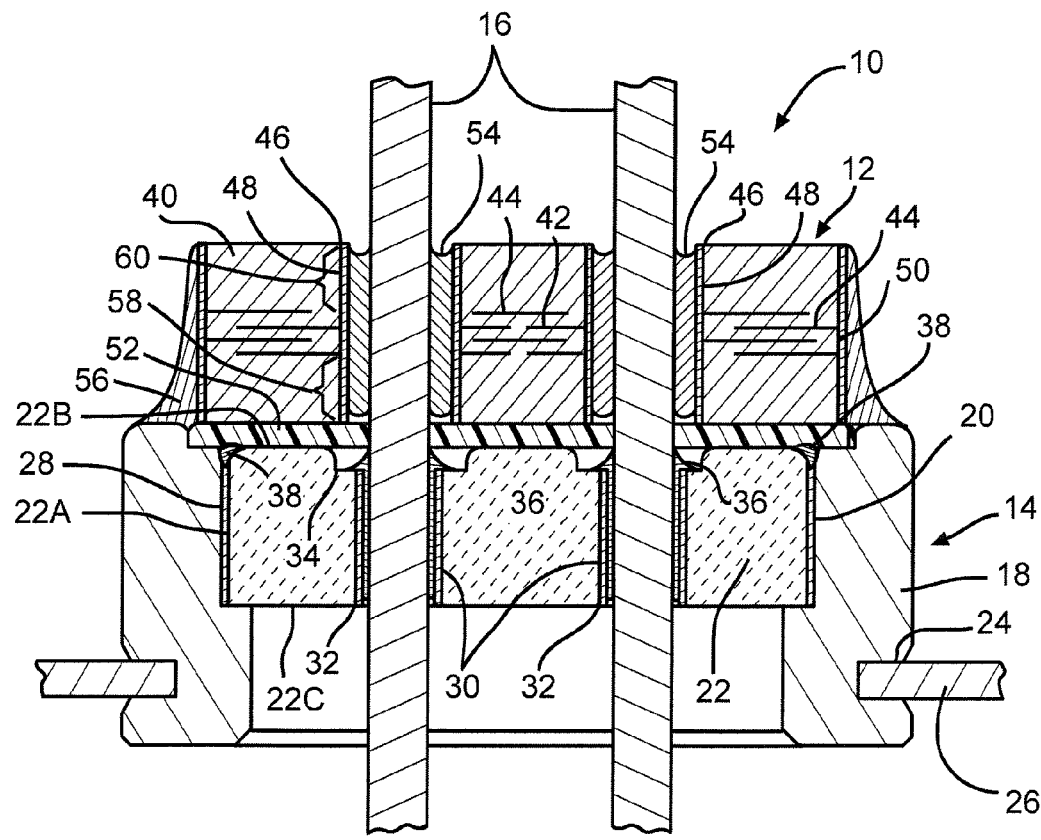
FIG. 1 is a cross-sectional view of a prior art filter feedthrough capacitor assembly 10.

As previously described, the substrate 102 has a preferred thickness of about 0.010 inches. The electrode layer zone consisting of the active electrode layer 104, the dielectric layer 110, the ground electrode layer 112 and the over-glaze 114 has a maximum thickness of about 0.007 inches. This means that the total thickness for the present capacitor 100 comprising one active layer (plate) and one ground layer (plate) is significantly less than that of the previously described prior art capacitor 10 (FIG. 1) having a total thickness of about 0.030 inches. The majority of the height and, therefore, space savings is the result of using the sintered substrate 102 and screen-printed over-glaze 114 instead of the prior art lower and upper dielectric zones 58 and 60. The over-glaze 114 has a thickness of about 0.0005 inches while the prior art upper dielectric zone 60 has a thickness of about 0.010 inches. The increased thickness for the prior art dielectric is to help prevent warping of the capacitor 10 because barium titanate and similar dielectric materials are relatively weak and prone to distortion during sintering. The alumina substrate 102 of the present invention is much stronger and more capable of maintaining its structure planarity, even after sintering. This means that a thick over glaze or over dielectric layer is not needed, which results in less space being occupied by the capacitor.

Thus, FIG. 3 illustrates a capacitor 100 comprising one active electrode layer 104 and one ground electrode layer 112 segregated from each other by an intermediate dielectric layer 110. This structure is sufficient to provide a feedthrough filter capacitor 100 according to the present invention. FIG. 4 shows the finished capacitor 100 electrically connected to a terminal pin 116 by a conductive epoxy bead 118. The terminal pin 116 is part of a hermetic feedthrough assembly as previously described with respect to the prior art filter feedthrough capacitor 10. However, for the sake of simplicity the feedthrough is not shown in this drawing. Nonetheless, the epoxy bead 118 surrounds the terminal pin 116 of a feedthrough assembly and is in direct electrical contact with the active electrode layer 104 and the terminal pin.

While the active and ground layers 104, 112 have been described as a single layer that is not necessary. As described in U.S. Pat. No. 5,978,204 to Stevenson, each layer 104, 112 can comprise two closely spaced apart layers separated from each other by a relatively thin dielectric layer. This patent is assigned to the assignee of the present invention, and incorporated herein by reference.

Figure 5:
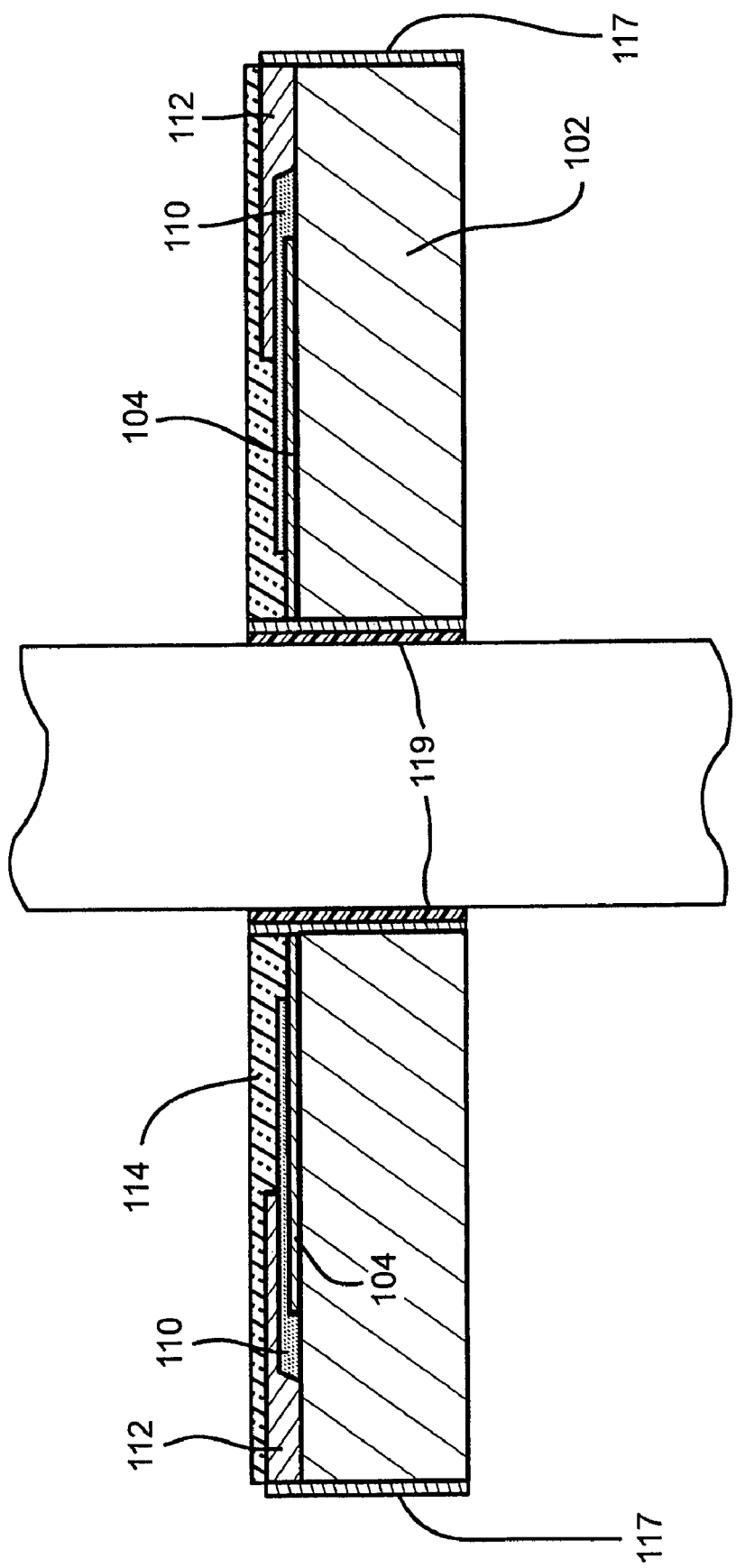
FIG. 5 is a partial cross-sectional view of the filter capacitor shown in FIG. 3 electrically connected to a terminal pin 116 by a metallization layer 117 and conductive epoxy 119.

FIG. 5 shows the filter capacitor 100 of FIG. 3, but provided with a metallization layer 117 applied to the sidewall of the terminal pin bore 106 and the outer edge 108. As with the prior art capacitor 10, suitable metallization materials 117 include titanium, niobium, tantalum, gold, palladium, molybdenum, silver, platinum, copper, carbon, carbon nitride, titanium nitrides, titanium carbide, iridium, iridium oxide, tantalum, tantalum oxide, ruthenium, ruthenium oxide, zirconium, and mixtures thereof. The metallization layer 117 may be applied by various means including, but not limited to, sputtering, e-beam deposition, pulsed laser deposition, plating, electroless plating, chemical vapor deposition, vacuum evaporation, thick film application methods, aerosol spray deposition, and thin cladding. The thusly constructed capacitor filter is electrically connected to the terminal pin 116 by a layer of conductive polyimide 119, and the like.

Figure 6:
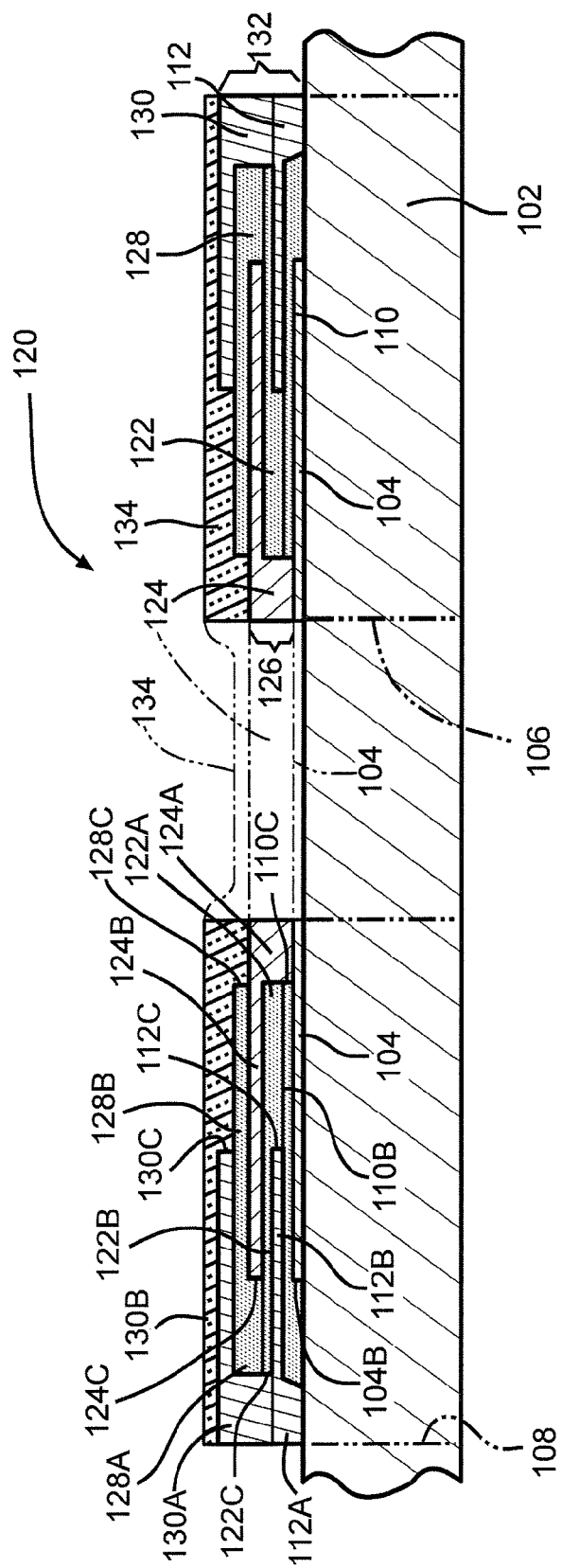
FIG. 6 is a cross-sectional view of another embodiment of a screen-printed filter capacitor 120 according to the present invention.

In some applications it may be desirable to increase the capacitor's filtering capability, and this is done by increasing the number of segregated active and ground electrode layers supported on the substrate 102. In FIG. 6, a capacitor 120 containing three plate sets is shown. This capacitor 120 is built by screen-printing additional active and ground electrode plates sandwiched around an intermediate dielectric layer on top of the capacitor structure 100 illustrated in FIGS. 3 to 5, but without the over-glaze layer 114. In particular, a second dielectric layer 122 is first screen-printed over the bottom ground electrode layer 112. The second dielectric layer 122 has a proximal base portion 122A that begins at the distal edge 110C of the first dielectric layer 110. Dielectric layer 122 is in direct contact with an exposed portion of the distal planar portion 110B of the first dielectric layer and continues to a distal planar portion 122B in direct contact with the upper surface of the distal planar portion 112B of the first ground electrode layer 112. However, the second dielectric layer 122 terminates at an edge 122C spaced from the outer edge 108 of the capacitor 120. This second dielectric layer 122 is completed by sintering as previously described.

A second active electrode layer 124 is then screen-printed on top of the second dielectric layer 122. In its finished form, the second active electrode layer 124 has a proximal base portion 124A in direct contact with the first active electrode layer 104 adjacent to the terminal pin bore 106. The direct contact between the proximal base portion 124A of the second active electrode layer 124 forms a common active base 126 having an edge adjacent to the terminal pin bore 106. The proximal base portion 124A leads to a distal planar portion 124B of the second active electrode plate 124 that is in direct contact with the upper surface of the second dielectric layer 122. The distal planar portion 124B of the second active layer 124 extends to an edge 124C that is in vertical alignment with the edge 104B of the first active electrode layer 104. The second active electrode layer 124 is then subjected to a sintering process as previously described.

A third dielectric layer 128 is next screen-printed over the second active electrode layer 124. The third dielectric layer 128 has a proximal base portion 128A that begins at the edge 122C of the distal portion 122B of the second dielectric layer 122 and in direct contact therewith, and continues to a distal planar portion 128B in direct contact with the distal planar portion 124B of the second active electrode layer 124. However, the third dielectric layer 128 terminates at an edge 128C spaced from the terminal pin bore 106. The third dielectric layer 128 is completed by sintering as previously described.

A second ground electrode layer 130 is then screen-printed on top of the third dielectric layer 128. The second ground electrode layer 130 has a proximal base portion 130A in direct contact with the proximal base portion 112A of the first ground electrode layer 112 adjacent to the outer edge 108 of the capacitor 120. The proximal base portion 130A leads to a distal planar portion 130B of the second ground electrode plate 130 that is in direct contact with the upper surface of the third dielectric layer 128. The distal portion 130B extends to an edge 130C that is in vertical alignment with the edge 112C of the first ground electrode layer 112. The direct contact between the proximal base portions 112A, 130A of the respective first and second ground electrodes 112, 130 forms a common ground base 132 having an edge aligned with the capacitor outer edge 108. The second ground electrode layer 130 is then subjected to a sintering step as previously described.

This alternating pattern of screen-printing an active layer followed by a dielectric layer followed by a ground electrode layer continues until as many active/dielectric/ground layer sets as are needed to obtain a desired capacitance value and voltage rating. In each set, the proximal ends of the active electrode layers are in direct contact with each other immediately adjacent to the terminal pin bore 106 and the proximal ends of the ground electrode layers are in direct contact with each other immediately adjacent to the outer edge 108 of the capacitor. Every other dielectric layer has its proximal end in direct contact with the distal portion of the dielectric layer immediately below it, alternating first adjacent to the terminal pin bore 106, then adjacent to the outer capacitor edge 108.

The screen-printed capacitor 120 is finished by a screen-printing an over-glaze layer 134. In its finished form, the over-glaze 134 extends from the outer capacitor edge 108 to the terminal pin bore 106. The over-glaze material is a glass frit paste. The over-glaze layer is subjected to a final sintering in a similar manner as previously described with respect to the dielectric layers, except the maximum heating temperature is preferably held at about 600° C. for about 30 minutes. As with each of the active and ground electrode layers and each dielectric layer, the over-glaze layer consists of two sub-layers laid down one on top of the other. Each sub-layer is sintered after its deposition.

Figure 7:
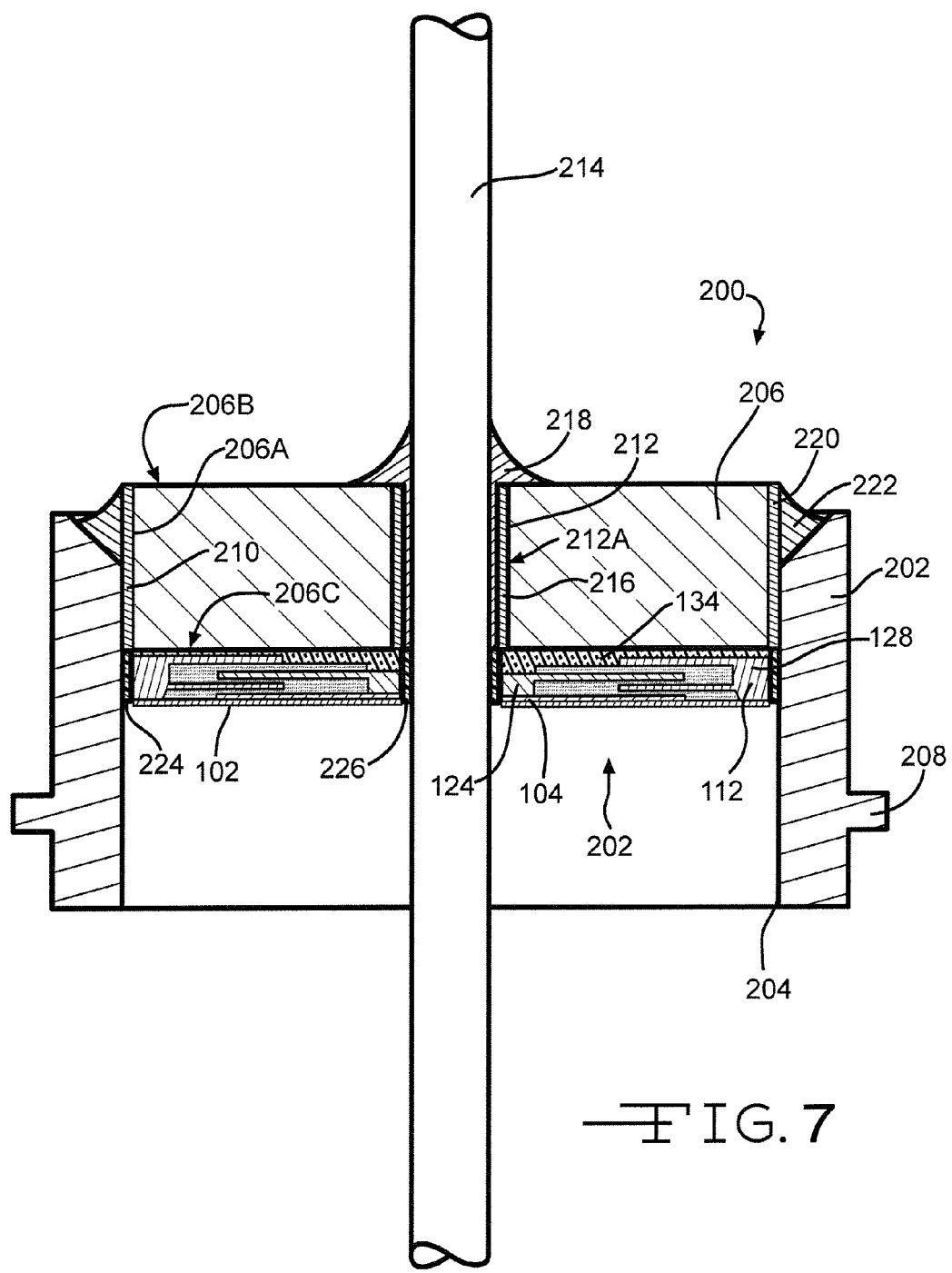
FIGS. 7 and 8 are cross-sectional views of various embodiment of the filter capacitor 120 shown in FIG. 6 attached to a hermetic feedthrough.

FIG. 7 shows the capacitor 120 of FIG. 6 attached to a feedthrough terminal pin assembly 200. The feedthrough terminal pin assembly 200 comprises a ferrule 202 defining an insulator-receiving bore 204 surrounding an insulator 206. The ferrule includes a surrounding flange 208 to facilitate attachment of the feedthrough capacitor assembly 200 to the casing of, for example, an implantable medical device. The method of attachment may be by laser welding or other suitable methods. The insulator 206 comprises a surrounding sidewall 206A extending to a first upper surface 206B and a second lower surface 206C. A metallization layer 210 is applied to the insulator sidewall 206A to aid in the creation of a brazed hermetic seal. Suitable materials for the ferrule 202, insulator 206 and metallization layer 210 are the same as described for these components with respect to the prior art capacitor 10.

The insulator 206 has a sufficient number of bores 212, in this exemplary feedthrough one, to receive the requisite number of terminal pins 214. The inner bore surface 212A is provided with a metallization layer 216 in a similar manner as the previously described insulator sidewall 206A. The terminal pin 214 is hermetically sealed in the bore 212 by a conductive, biostable material 218, such as gold or gold alloy, contacting the metallization layer 216 and the terminal pin 214. Similarly, a metallization layer 220 is provided on the insulator sidewall 206A. A gold braze 222 hermetically seals the insulator metallization 220 to the ferrule 202.

Figure 8:
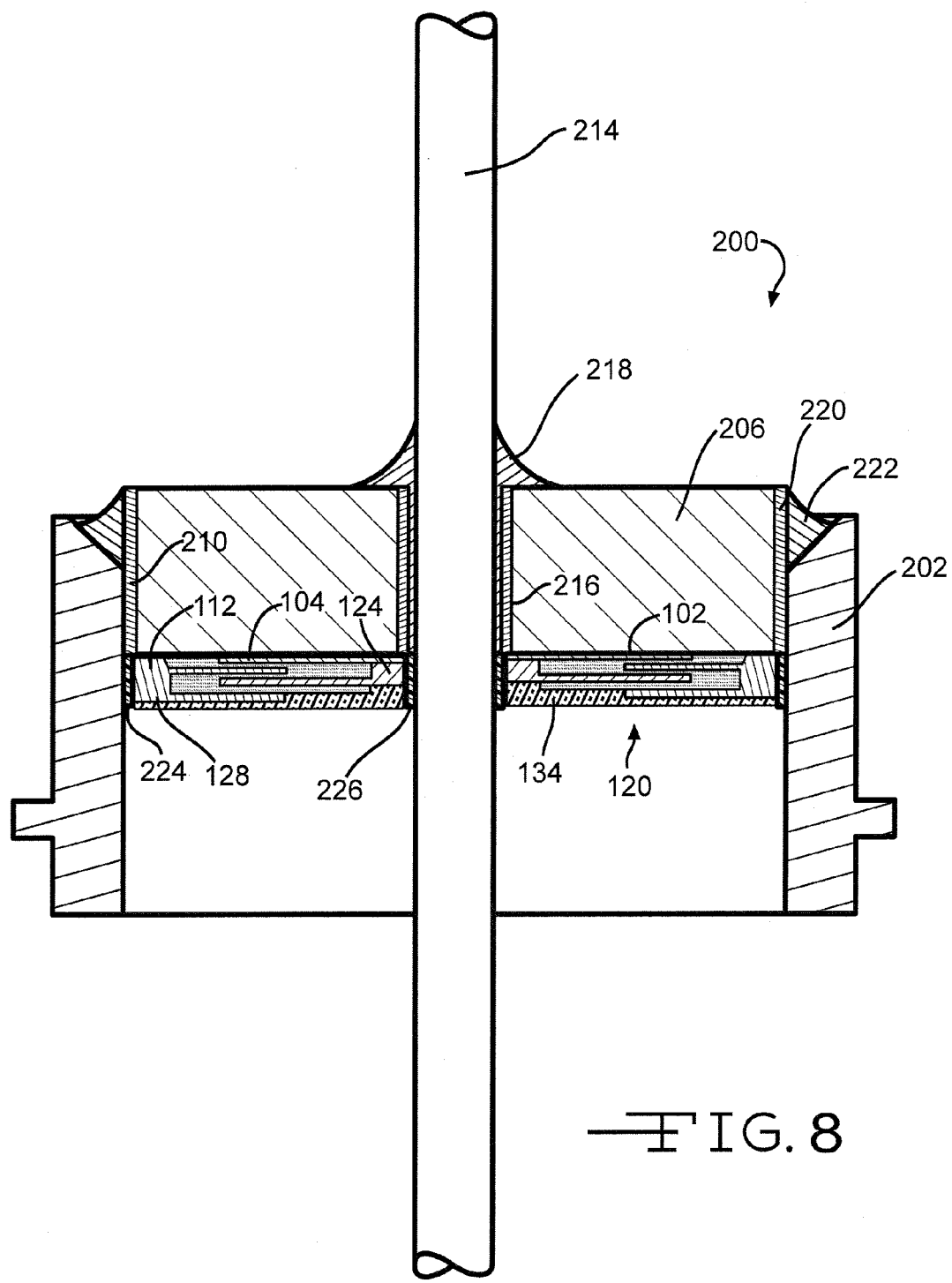

In the exemplary embodiment of FIG. 7, the capacitor 120 is attached to the feedthrough terminal pin subassembly 202 with the outer over glaze layer 134 seated against the lower insulator surface 206C. A conductive adhesive 224 contacts between the active electrode layers 104, 124 and the terminal pin 214 and a conductive adhesive 226 contacts between the ground electrodes 112, 128 and the ferrule 202. This means that the substrate 102 faces the interior of the medical device housing. In the exemplary embodiment of FIG. 8, the capacitor 120 is attached to the feedthrough terminal pin subassembly 200 with the insulator 102 seated against the lower insulator surface 206C and the outer over glaze layer 134 facing the housing interior.

Figure 9:
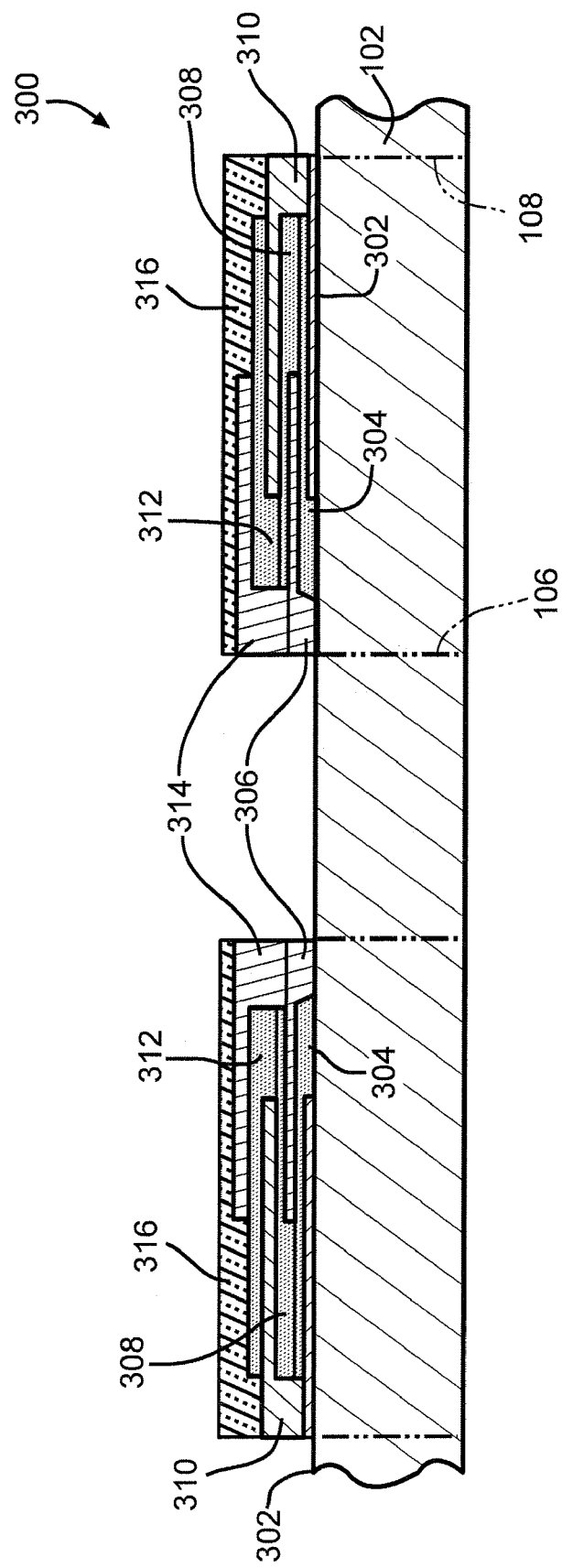
FIG. 9 is a cross-sectional view of another embodiment of a filter feedthrough capacitor 300 with the ground electrode 302 being the first layer screen-printed on the sintered substrate 102 instead of the active layer 104 as in FIG. 3.

FIG. 9 is a cross-sectional view of another embodiment of a feedthrough filter capacitor 300 according to the present invention. This capacitor 300 is similar in construction to the capacitor 120 shown in FIG. 6, except that the first layer screen-printed on top of the substrate 102 is a first ground electrode layer 302 instead of an active electrode layer. This is followed by a first dielectric layer 304, a first active electrode layer 306, a second dielectric layer 308, a second ground electrode layer 310, a third dielectric layer 312, a second active electrode layer 314 and finally an over glaze layer 316.

Figure 10:
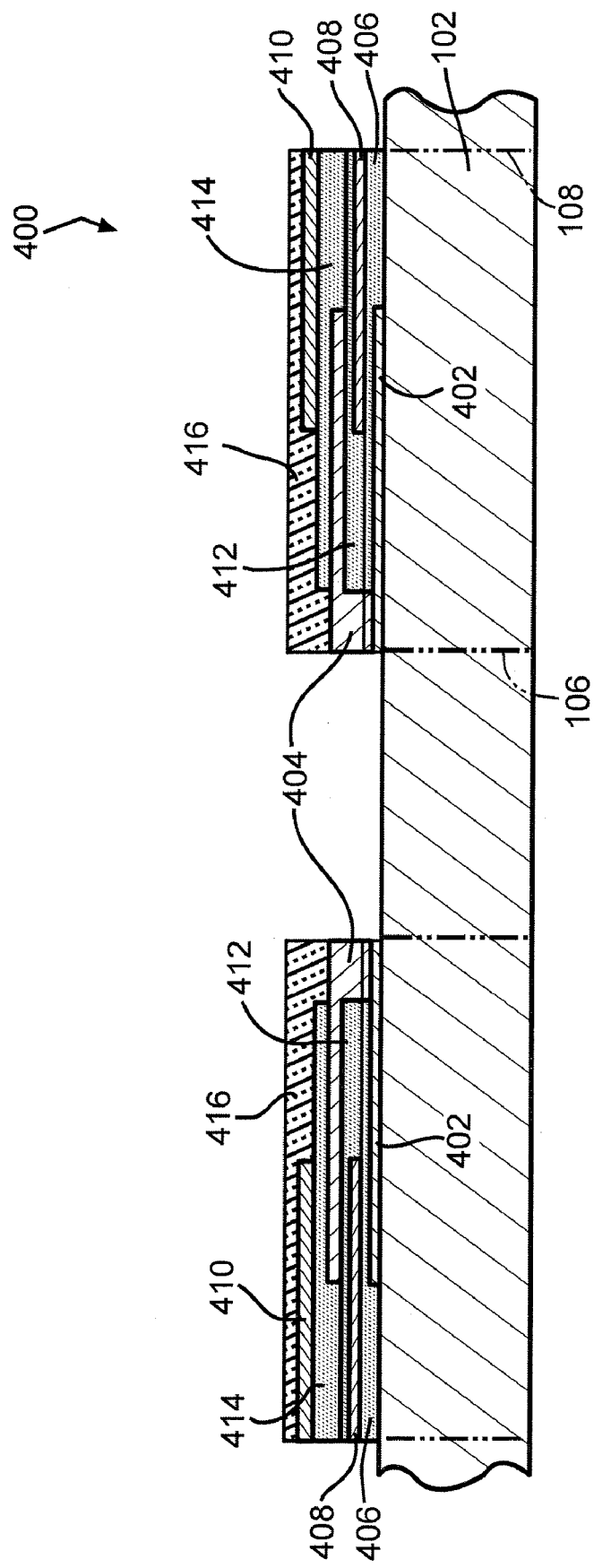
FIG. 10 is a cross-sectional view of another embodiment of a filter feedthrough capacitor 400 with the dielectric layers extending completely to the terminal pin bore 102 and the outer casing edge 108 to thereby segregate the active layers from each other and the ground layers from each other.

FIG. 10 is a cross-sectional view of another exemplary embodiment of a feedthrough filter capacitor 400 according to the present invention. Instead of the first and second active electrode layers 402, 404 being in direct physical contact with each other immediately adjacent to the terminal pin bore 106, they are segregated from each other. This is done by extending the first dielectric layer 406 completely to the terminal pin bore 106. Likewise, the first and second ground electrode layers 408, 410 are segregated from each other adjacent to the outer edge 108 of the substrate 102. This is done by extending the second and third dielectric layers 412, 414 to the outer substrate edge 108. An over glaze layer 416 is also shown.

Thus, the present invention provides a filter capacitor of reduced volume without compromising function and reliability. This is primarily the result of the pre-sintered substrate being of a ceramic material that maintains is shape and structure dimensions even after undergoing numerous sintering steps. Consequently, the active and ground electrode layers along with the intermediate dielectric layer can be laid down or deposited by a screen-printing technique, which means that they can be made relatively thin. The capacitor is finished with a relatively thin over-glaze. This means that a significant amount of space is saved or, a capacitor of a higher rating is provided in the same size as a conventional prior art capacitor using tape cast technology for the base dielectric layer.

It is appreciated that various modifications to the invention concepts described herein may be apparent to those of ordinary skill in the art without departing from the scope of the present invention as defined by the appended claims.

What is claimed is:

1. A method for providing a filtered feedthrough, comprising the steps of:
    a) providing a feedthrough comprising: a conductive ferrule comprising an annular sidewall having a ferrule opening extending axially along the ferrule sidewall from a first end to a second, opposite end thereof; a feedthrough insulator residing in the ferrule opening and having an outer sidewall hermetically sealed to an inner surface of the ferrule sidewall, the feedthrough insulator comprising at least one feedthrough insulator bore for passage of at least one electrically conductive terminal pin there through; and a terminal pin hermetically sealed in the feedthrough insulator bore;
    b) providing a filter capacitor, comprising the steps of:
        i) proving a filter insulator having a filter insulator bore for passage of the terminal pin there through and an outer sidewall residing adjacent to the inner surface of the ferrule sidewall;
        ii) depositing at least one first active electrode layer of an electrically conductive material supported on the filter insulator and having a first edge terminating immediately adjacent to the filter insulator bore;
        iii) depositing a first dielectric layer covering at least a portion of the first active electrode layer and having opposed ends spaced from the filter insulator bore and from the outer sidewall of the filter insulator, respectively; and
        iv) depositing at least one second, opposite polarity ground electrode layer of an electrically conductive material supported on the filter insulator and having a second edge terminating immediately adjacent to the outer sidewall of the filter insulator; and
    c) mounting the filter capacitor on at least one outer side of the feedthrough insulator; and
    d) electrically connecting the first active electrode layer to the terminal pin and the second ground electrode layer to the ferrule.

2. The method of claim 1 including depositing at least one of the first active electrode layer, the dielectric layer and the second ground electrode layer by screen printing them.

3. The method of claim 1 including providing the feedthrough insulator and the filter insulator both comprising alumina.

4. The method of claim 1 including selecting the feedthrough insulator and the filter insulator from the group consisting of alumina, zirconia, zirconia toughened alumina, aluminum nitride, boron nitride, silicon carbide, glass, and combinations thereof.

5. The method of claim 1 including providing the active and ground electrode layers being of Ag-Pt.

6. The method of claim 1 including providing the dielectric layer being of $BaTiO_3$ having a dielectric constant of about 10,000 k.

7. The method of claim 1 including depositing a sealing layer on the first active electrode layer, the dielectric layer and the second ground electrode layer.

8. The method of claim 7 including providing the sealing layer being of a sintered glass-frit.

9. The method of claim 1 including mounting the filter capacitor on the feedthrough insulator so that the feedthrough insulator and the filter insulator are in direct contact with each other.

10. The method of claim 1 including providing the first dielectric layer having a first base portion contacting the filter insulator and extending towards the filter insulator bore and further providing a second dielectric layer having a second base portion contacting the first distal portion of the first dielectric layer and leading to a second distal dielectric portion extending towards the outer sidewall of the filter insulator.

11. The method of claim 1 including providing two second ground electrode layers, the second one having a base portion leading to a distal electrode portion extending towards the outer sidewall of the filter insulator.

12. The method of claim 1 including providing the base portion of the second ground electrode layer contacting the first ground electrode layer immediately adjacent to the outer sidewall of the filter insulator.

13. The method of claim 1 including providing the filter insulator with a metallization layer on the filter insulator bore and on the outer sidewall and hermetically sealing these metallization layers to the terminal pin and to the inner surface of the ferrule sidewall, respectively.

14. The method of claim 1 including providing the filter capacitor having a dielectric constant up to about 13,000 k.

15. The method of claim 1 including providing two first active electrode layers, the second one having a base portion leading to a distal electrode portion extending towards the outer sidewall of the filter insulator.

16. The method of claim 15 including providing the base portion of the second active electrode layer contacting the first active electrode layer immediately adjacent to the filter insulator bore.

17. A method for providing a filtered feedthrough, comprising the steps of:
  a) providing a feedthrough comprising: a conductive ferrule comprising an annular sidewall having a ferrule opening extending axially along the ferrule sidewall from a first end to a second, opposite end thereof; a feedthrough insulator of alumina residing in the ferrule opening and having an outer sidewall hermetically sealed to an inner surface of the ferrule sidewall, the feedthrough insulator comprising at least one feedthrough insulator bore for passage of at least one electrically conductive terminal pin there through; and a terminal pin hermetically sealed in the feedthrough insulator bore;
  b) providing a filter capacitor, comprising the steps of:
    i) providing a filter insulator of alumina having a filter insulator bore for passage of the terminal pin there through and an outer sidewall residing adjacent to the inner surface of the ferrule sidewall;
    ii) depositing at least two active electrode layers of an electrically conductive material having respective edges located adjacent to the filter insulator bore, the first one of the active electrode layers being supported by the filter insulator;
    iii) depositing a dielectric material covering at least a portion of each of the active electrode layers and having opposed ends extending to the filter insulator bore and to the outer sidewall of the filter insulator; and
    iv) depositing at least two ground electrode layers of an electrically conductive material segregated from the active electrode layers by the dielectric material, the ground electrode layers having respective edges located adjacent to the outer sidewall of the filter insulator, the first one of the ground electrode layers being supported by the filter insulator; and
  c) mounting the filter capacitor on at least one outer side of the feedthrough insulator; and
  d) electrically connecting the active electrode layers to the terminal pin and the ground electrode layers to the ferrule.

18. The method of claim 17 including depositing at least one of the active electrode layers, the dielectric material and the ground electrode layers by screen-printing them.

19. The method of claim 17 including further screen-printing a sealing layer on the active electrode layers, the dielectric material and the ground electrode layers.

20. The method of claim 17 including providing the filter insulator with a metallization layer on the filter insulator bore and on the outer sidewall and hermetically sealing these metallization layers to the terminal pin and to the inner surface of the ferrule sidewall, respectively.

21. The method of claim 17 including providing the filter capacitor having a dielectric constant up to about 13,000 k.

22. The method of claim 17 including providing a second one of the at least two active electrode layers having a base portion leading to a distal active electrode portion extending towards the outer sidewall of the filter insulator, wherein the base portion of the second one of the active electrode layers contacts the first active electrode layer immediately adjacent to the filter insulator bore.

23. The method of claim 22 including providing the dielectric material comprising a first dielectric layer having a first base portion contacting the filter insulator and a first distal portion extending towards the filter insulator bore and including further providing a second dielectric layer having a second base portion contacting the first distal portion of the first dielectric layer and leading to a second distal dielectric portion extending towards the outer sidewall of the filter insulator.

24. The method of claim 23 including a second one of the at least two ground electrode layers having a base portion leading to a distal ground electrode portion extending towards the filter insulator bore, wherein the base portion of the second one of the ground electrode layers contacts the first ground electrode layer immediately adjacent to the outer sidewall of the filter insulator.

* * * * *